(No Model.)

J. P. HURLEY.
KITCHEN UTENSIL.

No. 332,201. Patented Dec. 8, 1885.

Witnesses:
George E. Sibson
Harry Drury

Inventor:
Joseph P. Hurley
by his Attorneys
Howson & Sons

UNITED STATES PATENT OFFICE.

JOSEPH P. HURLEY, OF PHILADELPHIA, PENNSYLVANIA.

KITCHEN UTENSIL.

SPECIFICATION forming part of Letters Patent No. 332,201, dated December 8, 1885.

Application filed June 22, 1885. Serial No. 169,379. (No model.)

*To all whom it may concern:*

Be it known that I, JOSEPH P. HURLEY, a citizen of the United States, residing in Philadelphia, Pennsylvania, have invented certain Improvements in Kitchen Utensils, of which the following is a specification.

The object of my invention is to so construct a stand for kettles, sad-irons, and other kitchen utensils that it will support the articles firmly; that it will not be liable to be upset, and that it may be used either side up, and that it will not make indentations in the table when articles are placed upon it.

Figure 2:
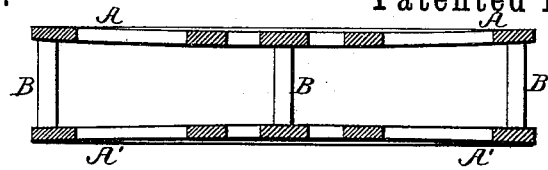
Figure 1:
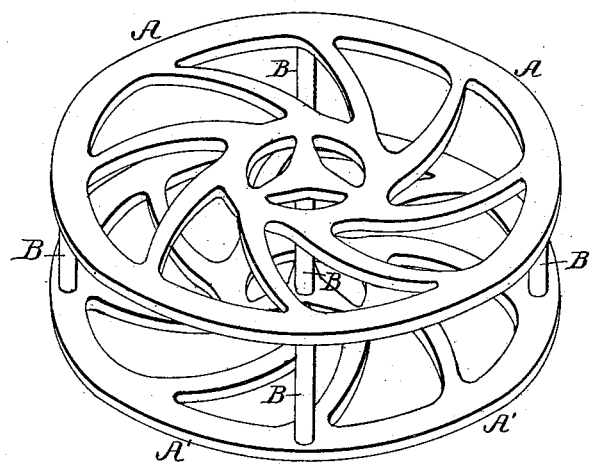
Figure 3:
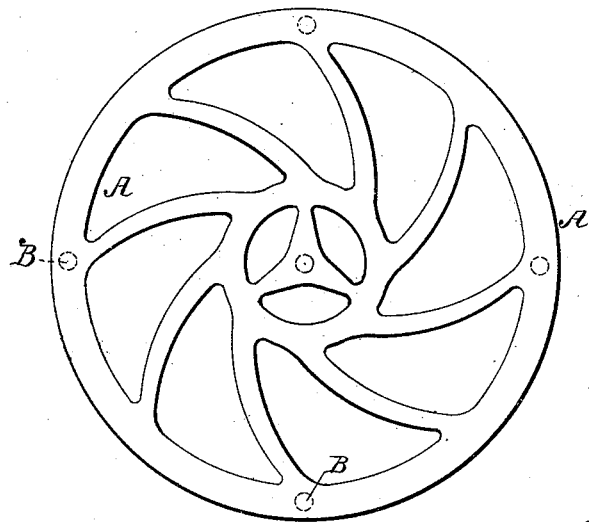

In the accompanying drawings, Figure 1 is a perspective view of my improved support or stand. Fig. 2 is a transverse section, and Fig. 3 is a plan view.

I make my improved stand of two metallic plates, A and A', united by bars or legs B, the whole cast in one piece, so as to avoid uniting the parts together and to make a firm and strong stand, all parts of which are fixed with reference to the other parts. I prefer to provide each cast plate with suitable openings or open-work of any desired design for the sake of lightness, appearance, and convenience of handling.

It will be seen that the stand can be used either side up indifferently, and that it presents a very large extent of bearing-surface on the table, so that there will be no liability to indent the latter or upset the stand by hastily placing articles upon it.

It sometimes occurs that kettles or other vessels are slightly rounded at the bottom, so that when set on a flat surface they will not be firm. I therefore prefer to slightly dish the surfaces of the plates A A', as shown in Fig. 2, in order that such a kettle or vessel may find a firm bearing on the stand.

I am aware that stands, and more particularly spirit-lamp stands, have heretofore been made with plates united by legs; but in such case the legs have been in the form of separate tubular pillars with bolts or screw tie-rods passing through them to unite the two plates together. Such a construction cannot stand the rough usage to which sad-iron holders are subjected, and the parts soon work loose from each other, whereas by making my holder in one piece a firm and strong support is afforded at all times.

I claim as my invention—

As a new article, the herein-described metallic stand for kitchen utensils, consisting of two plates, A and A', with connecting-legs B, all cast in one piece, substantially as described.

In testimony whereof I have signed my name to this specification in the presence of two subscribing witnesses.

JOSEPH P. HURLEY.

Witnesses:
　HENRY HOWSON,
　HARRY SMITH.